United States Patent [19]

Wenzel

[11] Patent Number: 5,077,959
[45] Date of Patent: Jan. 7, 1992

[54] DUAL HYDROSTATIC DRIVE WALK-BEHIND MOWER

[75] Inventor: Philip H. Wenzel, Vernon Center, N.Y.

[73] Assignee: Ferris Industries, Inc., Oneida, N.Y.

[21] Appl. No.: 674,109

[22] Filed: Mar. 25, 1991

Related U.S. Application Data

[63] Continuation-in-part of Ser. No. 578,147, Sep. 6, 1990.

[51] Int. Cl.⁵ ............................................. A01D 34/68
[52] U.S. Cl. ....................................... 56/11.1; 56/11.3; 56/11.5; 180/6.32; 180/19.1
[58] Field of Search ...................... 56/11.1, 11.2, 11.3, 56/11.4, 11.5, 11.8, 17.6, DIG. 6, DIG. 18; 180/6.2, 6.24, 6.34, 6.48, 19.1, 19.2, 19.3, 248

[56] References Cited

U.S. PATENT DOCUMENTS

| | | | |
|---|---|---|---|
| 4,787,195 | 11/1988 | Wenzel | 56/11.1 |
| 4,920,733 | 5/1990 | Berrios | 56/11.4 X |
| 4,920,734 | 5/1990 | Wenzel | 56/11.1 |
| 4,967,543 | 11/1990 | Scag et al. | 56/10.8 |
| 4,991,382 | 2/1991 | Scag | 56/10.9 |
| 5,020,308 | 6/1991 | Braun et al. | 56/11.5 X |

*Primary Examiner*—David J. Bagnell
*Attorney, Agent, or Firm*—Wall and Roehrig

[57] ABSTRACT

An extra-wide self-propelled lawn mower employs twin hydrostatic transmissions to power left and right drive wheels situated behind a forward mowing deck. There are left and right primary speed control levers adjacent hand grips on the mower hand assembly. These have linkages that include a common pivot shaft and respective spring couplings to control the actuator arms of the hydrostatic transmissions. Secondary speed control levers, in the form of brake levers, are mounted adjacent the right and left hand grips and are non-resiliently coupled to the hydrostatic transmission actuators arms. The secondary levers are squeezed to override the primary speed control and slow the respective transmission for braking or to effect a turn, pivoting about the inside wheel. Squeezing the secondary control lever completely will cause the wheel on that side to reverse, effecting a pivoting at the center of the mower.

6 Claims, 3 Drawing Sheets

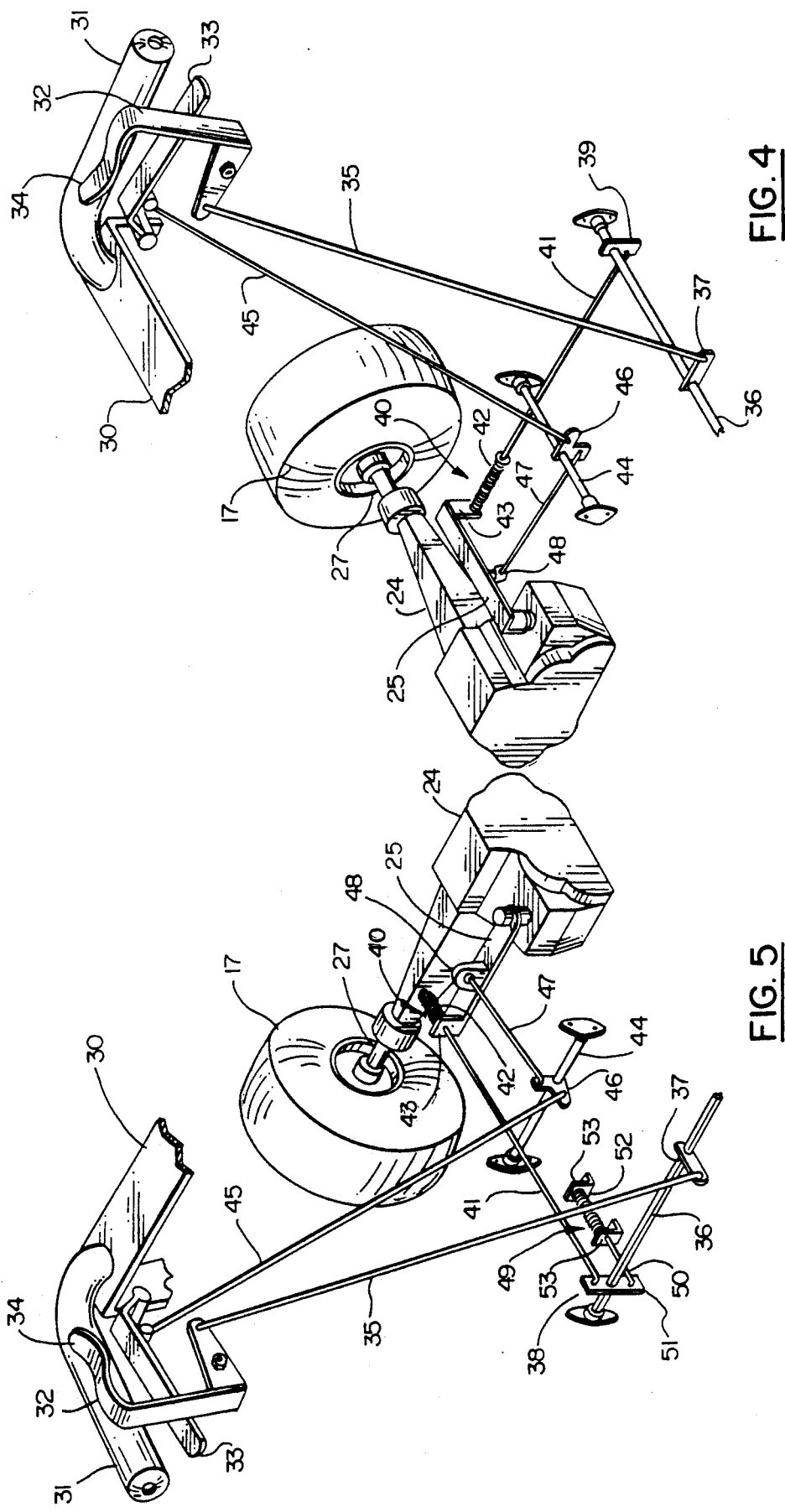

DUAL HYDROSTATIC DRIVE WALK-BEHIND MOWER

CONTINUING APPLICATION DATA

This is a continuation in part of my copending application Ser No. 07/578,147, filed Sept. 6, 1990.

BACKGROUND OF THE INVENTION

This invention relates to self-propelled institutional or commercial type lawn mowers, and is especially directed to large lawn mowers intended for extended service on a daily basis, e.g. by commercial landscape gardeners or ground maintenance personnel responsible for attending to lawns at corporate or government office parks, golf courses, condominiums, and the like. The invention is especially directed to walk-behind and sulky-type riding mowers in which there is an operator position situated behind the mowing mechanism.

At present, most lawn mowers of this type employ belt drives both for the mower blade and for the drive wheels. In these current mowers, each wheel is belt driven and is provided with a clutch and an individual wheel-brake which are intimately linked. The belts wear out quickly and the drive thus has a high maintenance rate. The belts also tend to slip when the grass is wet. Changing speeds requires disengaging both belts by squeezing hand calipers found on each handle bar grip. A speed selector control must then be adjusted to effect speed changes. Because these actions take considerable time to accomplish, the operator usually opts not to make speed changes. This, however, renders precision mowing near obstacles difficult or impossible. Consequently, an intolerable amount of follow-up mowing with a hand mower or trimmer is usually required. The operator must also release his grip on the steering controls when making various machine adjustments; this can and often does lead to an accident.

These same hand calipers when squeezed to their maximum positions engage a brake which is used for turning purposes. Because the hand calipers are spring controlled, they require considerable hand pressure to engage. This continuous hand pressure is extremely tiring. Due to the direct-drive, non-differential type axle, continual squeezing is required to keep the mower steered in the proper direction.

Previous walk-behind mowers generally do not have a reverse speed. Because of the excessive forward weight distribution, manual backing of the mower is extremely tiring on the operator and is often dangerous.

An improved mower that employs a hydrostatic transmission has been proposed in U.S. Pat. No. 4,787,195. This patent describes a self-propelled lawn mower that has a mowing deck that supports one or more blades. A pair of drive wheels are rotatably supported in a power deck located behind the mowing deck. Drive linkages convey power from an engine mounted upon the power deck to the rear drive wheels and also to a blade drive system for rotating the mowing blades. An operator position is situated rearward of the drive wheels. The mower includes handle arrangement behind the drive wheels with operator controls mounted on the handle arrangement behind the drive wheels with operator controls mounted on the handle for selectively controlling the speed and direction of the drive wheels. In the mower of that patent, a hydrostatic transmission has an input shaft driven by the engine, an output shaft arranged to turn the drive wheels, and a control shaft that is rotated to control the ratio of the output shaft speed to the input shaft speed in a continuous range of speeds from reverse, through neutral, to maximum forward speed. The operator controls include a transmission control lever that is connected, for example, via a cable or a rigid linkage, to the control shaft of the hydrostatic transmission. This enables the operator to select a desired drive wheel speed without removing his or her hand from the steering handle. The input shaft of the hydrostatic transmission can be vertically or transversely disposed. A control lever for the hydrostatic transmission can be a C-shaped or L-shaped member that is connected at one end to the control shaft, with a control cable connected between the control handle and the member. A cooling fan can be mounted on the shaft of the hydrostatic transmission for air cooling the same. The drive wheels are connected to the hydrostatic transmission through a differential-type drive system whose differential right and left output shafts serve as axles on which the drive wheels are mounted. These output shafts are provided with independent right and left disk brakes, with separately actuated operating levers, so that the operator can brake the wheels independently for precision steering of the mower.

The engine is mounted with its center of gravity rearward of the drive wheel shaft, to serve as a counterweight or counterpoise to balance the weight of the mowing deck. Consequently, the mower center of gravity is disposed at or close to the drive wheel axle. This aids traction significantly and facilitates steering of the machine.

The small to medium size hydrostatic-drive mower can be steered in either of two ways:

1. Because of the differential drive, the operator can simply apply body weight to the handle bars to make directional changes. This is impossible with previous mowers because their wheels are not differentially coupled to the drive shaft.

2. Each wheel is fitted with a disk brake which is engaged by means of a hand lever on a corresponding handle grip.

Engaging the disk brake is much easier than engaging the hand brake on other mowers because there is no spring-actuated clutch in the disk brake linkage.

Squeezing a selected hand caliper to engage one of the disk brakes results in an almost effortless turn toward the braked-wheel side of the machine.

These mowers can quickly turn one-hundred-eighty five degrees to mow a row alongside a just-mowed row. To do this, the operator simply squeezes one brake lever, and releases the grip of the other hand. The differential drive then pulls the mower around and, when the mower is turned, the operator simply releases the brake lever and resumes mowing.

Unfortunately, the effect of the differential drive is to transfer all of the power to the unbraked wheel at double the wheel speed that was experienced when both wheels were unbraked. This makes the mower rather difficult to control, unless the transmission control can be moved to a lower setting to keep the wheel speed even. However, in the arrangement of U.S. Pat. No. 4,787,195, the control lever is on one side of the handle bar only, so the operator can effect a hand brake turn only in one direction, e.g., only to the right where the control lever is mounted near the right hand grip.

In an improved mower, controls are provided on both the right and left hand grips for controlling the speed of the hydrostatic transmission drive to the rear wheels. This is described in U.S. Pat. No. 4,920,734. That mower has independent right and left disk brakes and a hydrostatic transmission which is driven by the mower's engine and which is connected through a differential drive to the right and left rear wheels. The control mechanism includes a pair of operating levers on the handle grips with a linkage connecting both operating levers to the speed regulator of the hydrostatic transmission. The operator can adjust the speed setting of the hydrostatic transmission using either hand without having to release his or her hands from the hand grips and without having to uncouple the transmission from the engine.

The control mechanism comprises a pair of thumb levers pivotally mounted on the handle bar assembly adjacent the respective hand grips. These are pushed forward to move the hydrostatic transmission to a forward speed, and are pulled back to move the hydrostatic transmission to a reverse speed. The two levers are each linked through a common linkage to the actuator of the transmission, so that the drive wheel speed can be controlled with either lever. This permits effective one-hand braking and speed control permitting high-speed hand-brake turns without the operator relinquishing control over wheel speed. This advantage comes about because the operator can reduce the operating wheel speed, by backing off the thumb lever slightly, to counter the effect of the differential which would otherwise double the speed of the unbraked outer wheel.

The control assembly linkage can include a pivot rod mounted transversely beneath the mowing deck with arms that are coupled through rigid connecting rods to the thumb levers. Another arm on this pivot rod is coupled through a connecting rod to the actuator levers for the hydrostatic transmission. Motion of either or both thumb levers will rotate the pivot rod and move the actuator lever. A spring return on the mower is connected to the actuator lever so that the actuator lever will seek neutral as soon as the thumb levers are released.

The thumb levers are somewhat spoon shaped, i.e., bent forward and then extending upward. These levers are adjustably mounted on a rocker plate so that they can accommodate different hand sizes. This arrangement permits the operator to provide continuous pressure on the lever without significant fatigue. Also, for safety consideration, backing the mower requires pulling back on the lever or levers, and rearward motion stops as soon as the control levers are released.

A belt-loop-coil operator presence switch can be included to shut the mower down if the operator loses control of the mower.

This system works well for small to medium size commercial mowers (36 inches to 48 inches width). However, for larger mowers (e.g., 52 inches or wider) it is more convenient for the operator to control the speed to each drive wheel individually. In many locations, especially where the terrain is not level, more power has to be applied to one wheel or the other to keep the mower moving straight ahead. On a slope, the mower has a tendency to turn downhill. If the mower is of the larger type, the mower is often far too heavy for the operator simply to manhandle; braking the uphill side to control the direction is not precise, and also causes rapid wear of brake pads.

One extra-wide walk-behind mower has recently been proposed in U.S. Pat. No. 4,920,733. This mower has a dual hydrostatic drive system, in which the engine drives a pair of hydraulic pumps, each of which is connected to a hydraulic motor, one motor propelling the left drive wheel and the other motor propelling the right drive wheel. In this particular design, motion is controlled entirely by left and right squeeze levers that control the fluid flow between each of the hydraulic pumps and its respective motor. There are no brakes as such. The handles are squeezed to reverse the torque applied onto the drive wheels. Releasing the levers puts the mower in full forward. This design mower does not default to a neutral condition, so if the operator loses control of the mower, the mower will continue to propel itself forward at full speed.

A more reliable, safer extra-width walk-behind mower, with positive speed control to each drive wheel and fail-safe braking or stopping for each wheel, is described in my earlier copending application Ser. No. 07/587,147.

In the extra-wide mower described therein, a single engine mounted on the power deck powers the blade assembly of the mowing deck and also couples to a power train to propel the power wheels. A handle bar assembly attached onto the back of the mower has right and left hand grips and right and left speed control levers. Optionally there may be independent left and right brakes actuated by brake levers disposed adjacent the grips, but these are not necessary on the larger mowers.

The power train includes respective hydrostatic transmissions for the two drive wheels. Each transmission has an input shaft driven by the engine, with a drive that is connected to the associated left or right drive wheel. A speed regulator on each hydrostatic transmission permits adjusting the speed ratio of the output drive shaft to the input shaft within a continuous range from reverse, through neutral wherein the respective output drive shaft is idle, to maximum forward. The two speed regulators are controllable independently.

There are respective left and right speed control levers positioned on the handle bar assembly adjacent the respective grips, and connected to the speed regulators by speed control linkages to set the associated speed regulators at any desired position within their continuous ranges. This permits the operator to select a desired drive wheel speed for each drive wheel without having to release the grips of the handle bar assembly and without having to uncouple the transmission from the engine.

The control levers can be configured as a pair of thumb levers pivotally mounted on the handle bar assembly adjacent the respective grips, for example, as illustrated in my recent U.S. Pat. No. 4,920,734, but coupled through respective independent linkages to the speed control actuators of the respective hydrostatic transmissions.

The two transmissions can be mounted with a gap between them through which can pass the drive belt for the mower blades. This eliminates the need for additional belts or jack shafts. Also, the drive pulleys for driving the two hydrostatic transmissions and the drive pulley for the belt to the mower deck can each be mounted directly on the engine output shaft. An electric clutch can be incorporated onto the blade drive pulley, so that the blades can be uncoupled from engine power.

Spring returns can be associated with respective control linkages of the left and right hydrostatic transmissions, so that if one or both of the control levers are released, the transmission or transmissions will be returned to a neutral position. In the neutral position, the transmission brings its associated drive wheel quickly to a halt. Each drive wheel can be independently backed up by pulling back on the respective control lever, and each drive wheel can be propelled at an independently selected forward drive speed by pressing forward on the respective control lever. By driving one drive wheel forward and the other reverse, the mower can turn in place.

The control arrangement and lever arrangement, in combination with the twin hydrostatic transmission drive, permits the operator to mow continuously without significant fatigue, even on rolling or hilly terrain.

Unfortunately, with the mower of this design if the operator removes one hand from the machine for any reason, the wheel on that side of the mower will tend to stop, turning the machine to that side. This makes it difficult for the operator to adjust his or her hat, to brush away flies or mosquitos, or to make any minor adjustments to the engine while underway. It is also difficult for the operator to effect a rapid "hand brake" turn as discussed above in connection with the single-transmission drive mower of my U.S. Pat. No. 4,920,734.

Ideally, the mower speed control levers should permit independent speed control to facilitate normal steering, and also permit common speed control so that this mower has the advantages described above for the smaller hydrostatic-drive mower.

OBJECTS AND SUMMARY OF THE INVENTION

It is an object of this invention to provide an extra-wide self-propelled lawn mower which avoids the drawbacks of the prior art.

It is a more specific object of this invention to provide an extra-wide self-propelled mower with twin hydrostatic transmissions having both forward and reverse directions, and permitting infinitely variable speed selection from a reverse speed, through neutral, to a maximum forward speed.

It is a more specific object of this invention to provide an extra-wide self-propelled mower with variable speed, reversing hydrostatic transmissions for the left and right drive wheels, which can be actuated from either or both left and right hand speed control levers positioned immediately adjacent the handle grips to permit the operator to effect speed and direction adjustment of the two drive wheels independently without moving his or her hands from the handle grips.

It is another object to provide an extra-wide self-propelled mower of this type which provides for independent control permitting reducing the speed to one of the left and right drive wheels and maintaining the speed on the other, with the operator using one or both hands, so that power distribution to the wheels and braking (or reversing) of the wheels can be positively controlled by the operator with either hand or with both hands on the handle grips.

In accordance with an aspect of this invention, an extra-wide self-propelled walk-behind lawn mower has a forward extra-wide mowing deck that houses a cutting blade assembly that contains one or more rotary blades, a rear drive deck or power deck on which an engine, e.g. a gasoline motor, is mounted, a pair of drive wheels, a power train that couples the engine to the drive wheels, a power takeoff that connects the blade assembly to the engine, and a handle bar assembly attached onto the back of the mower for steering the drive wheels. The handle bar assembly has left and right hand grips to be grasped by the operator.

As with the mower of previous patent application Ser. No. 07/578,147, there are left and right speed control levers positioned on the handle bar assembly adjacent the respective grip. These are connected by a primary speed control linkage to the speed regulators of the left and right hydrostatic transmissions. The primary speed control linkage includes a common pivot shaft that is connected by substantially rigid connecting rods to the left and right speed control levers, and is also connected by yieldable connecting rods to speed control arms mounted on the respective speed control regulators of the hydrostatic transmission.

There are also secondary left and right speed control levers, which can be in the form of the brake levers or brake paddles as employed in the mowers of my previous U.S. Pat. Nos. 4,787,195 and 4,920,734. These are disposed adjacent the respective left and right grips so that they can be actuated by a squeeze of the operator's hands.

The left and right secondary speed control levers or paddles are connected by connecting rods to independent left and right secondary pivot shafts which are in turn connected by rigid connecting rods to the associated hydrostatic transmission speed regulators. Squeezing the secondary speed control lever will rotate the respective pivot shaft and move its connecting rod to push or pull the speed regulator. Squeezing the secondary control lever overcomes the spring force applied to the speed regulator by the primary speed control lever and linkage. In this way, the secondary speed control levers overcome the primary speed control levers and linkages, but only on their respective side of the mower. The secondary speed control levers and linkages do not affect the speed regulator of the transmission on the opposite side, whose speed remains determined by the primary speed control levers and linkages.

The primary linkage common pivot shaft has first and second pivot arms on the left side and third and fourth pivot arms on the right side. The first and third pivot arms are coupled by a substantially rigid connecting rod to the left and right speed control levers, while the second and fourth pivot arms are connected to the respective transmission speed regulators by yieldable spring couplings. With this arrangement, moving either or both primary speed control levers rotates the pivot shafts and urges both of the transmission speed regulators to a desired speed setting. However, squeezing one of the secondary speed control levers rotates its associated pivot shaft and overcomes the spring coupling on that side of the mower, but only on that side.

If both secondary levers are squeezed, the effect is to brake the mower and bring it to a halt. Further squeezing of both secondary levers reverses the mower. However squeezing of only one lever tends to brake, or reverse, the mower only on that one side. Therefore, with this arrangement it is possible to control forward motion of the far-side wheel and braking effect of the near-side wheel with only one hand on the mower. Thus, one-hand power turns can be executed easily and with a high level of control. The operator can also maintain a straight-ahead direction for the mower even though momentarily releasing one hand from the primary control lever.

If the operator releases all of the hand controls, i.e., both the left and right primary and secondary control levers, a spring return arrangement will bring both transmission speed regulators to the neutral position, and the mower will immediately halt. Thus the mower also has a fail-safe braking or stopping feature for both drive wheels.

The above and many other objects, features, and advantages of this invention will be more fully appreciated from the ensuing detailed description of a preferred embodiment, to be read in connection with the accompanying Drawing.

BRIEF DESCRIPTION OF THE DRAWING

FIG. 4 is a partial view of the mower showing the speed control arrangement for the right side of the mower.

FIG. 5 is a partial view of the mower showing the speed control arrangement for the left side of the mower.

DETAILED DESCRIPTION OF A PREFERRED EMBODIMENT

Figure 1:
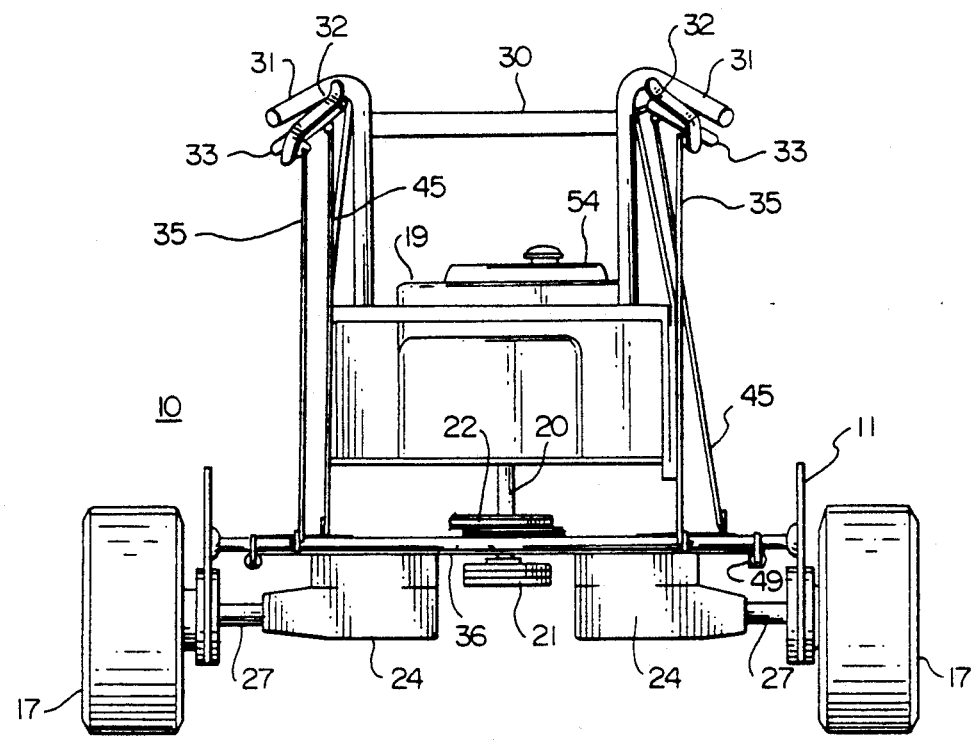
FIG. 1 is a rear elevation of an extra-wide self-propelled lawn mower according to a preferred embodiment of this invention.
Figure 2:
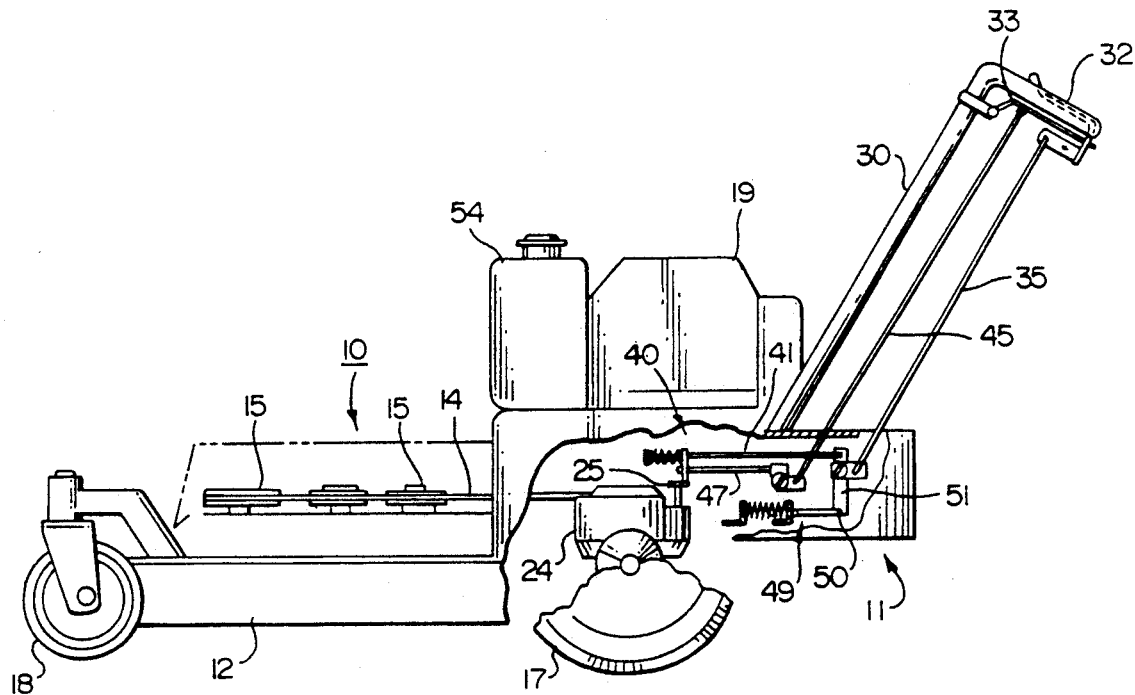
FIG. 2 is a side elevation of the lawn mower of this embodiment, in which a portion of the power deck is cut away.
Figure 3:
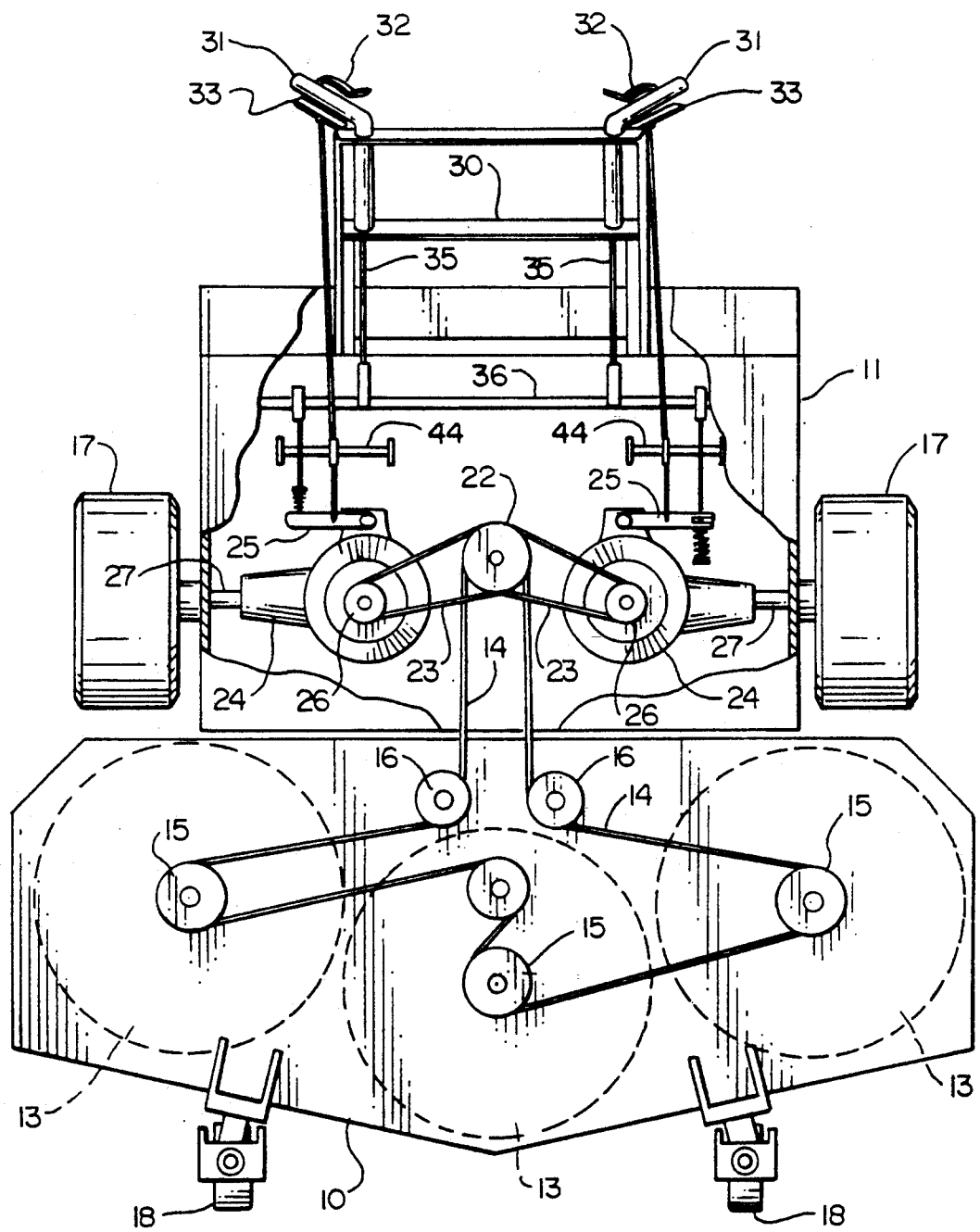
FIG. 3 is a top plan view of the lawn mower of this invention.

With reference to FIGS. 1-3 of the Drawing, a walk-behind power lawn mower is offered as an example to illustrate the principles of this invention.

The walk-behind rotary self-powered lawn mower has a mowing deck 10 and a power deck 11 located behind mowing deck. The mowing deck 10 can be 52 inches or 62 inches in width, or can in some cases be even wider. The mowing deck 10 is surrounded by a safety skirt or shroud 12 and has three rotary blades 13, shown schematically in FIG. 3. The blades 13 are linked together by a belt drive 14, which extends from the power deck 11 and travels over a system of pulleys 15 associated with the blades 13, and a number of idler pulleys 16. A pair of drive wheels 17 are here shown with larger-diameter tires preferably 18×6.50 size, or larger, and these are supported in the power deck 11. A pair of front casters 18 are mounted at the front of the power deck 10. These casters 18 preferably have foam-filled maintenance-free tires.

A gasoline engine 19, preferably a V-twin vertical-shaft industrial quality engine of twelve to eighteen horsepower, is mounted above the power deck 11. The center of gravity of the engine 19 is situated aft of the drive wheels 17 so that the weight of the engine balances the weight of the mowing deck assembly. Counter balancing the weight of the mowing deck simplifies steering and increases direction, and also eases the lifting of the mowing deck 10 when necessary to perform maintenance or to mount curbs.

The engine 19 is of the vertical type, i.e. with an output shaft 20 extending vertically downward through the power deck. The vertical shaft 20 is positioned somewhat behind the axis of the drive wheel 17. The output shaft 20 has a drive pulley 21 in which there is incorporated an electric clutch-brake, the pulley 21 driving the drive belt 14 for the blades 13. Here, the only connection between the power deck 11 and the mowing deck 10 is the single drive belt 14 that extends around the pulley 21 and then travels through the pulleys 15 and 16 on the mowing deck. This simplifies aligning and mounting, and eliminates problems found on many other mowers.

Above the pulley 21 on the shaft 20 are a pair of drive pulleys 22 that are connected by respective drive belts 23 to drive a pair of hydrostatic transmissions 24, disposed to the left and to the right of the mower, and mounted below the power deck. Each hydrostatic transmission 24 is a hydraulic transmission with a vertical input shaft and a horizontal output shaft. A pair of output levers 25 are mounted respectively on a regulator or control shaft of each of the hydrostatic transmission 24 to permit the operator to control speed and forward/reverse sense of rotation. At the top center of each of the hydrostatic transmissions is an input pulley 26 driven by a respective one of the belts 23. An output drive shaft 27 extends laterally from each of the hydrostatic transmission and serves as an axle for driving a respective one of the drive wheels 17. These shafts 27 are journalled in the power deck 11 behind the mowing deck 10.

A handle section 30 is disposed rearward of the drive wheels 17 and has left and right grips 31 for the operator. Right and left primary speed control levers 32 are disposed on the inside of the handle section 30 adjacent the hand grips 31, and right and left secondary speed control levers 33, in the form of brake paddles, are mounted alongside the grips 31 so that the operator can squeeze the secondary control levers 33 without removing his or her hand from the grip 31.

The primary speed control levers 32 are somewhat spoon shaped and have curved tips 34 to facilitate actuation by the operator's thumb to the forward position. The speed control levers 32 can be rocked forward to correspond to a forward position or rocked back to correspond to a reverse position of the hydrostatic transmissions 24. When released, the levers 32 assume a neutral position, as explained in more detail below. In neutral, the hydrostatic transmissions 24 serve as dynamic brakes for their respective drive wheels. These levers 32 can be placed into any speed positions corresponding to desired wheel speeds, from reverse through neutral to full forward. The primary speed control levers 32 are similar to those described in the earlier U.S. Pat. No. 4,920,734, having a common assignee.

Each of the control levers 32 has mounted thereto a rigid connecting rod 35 that extends through the power deck 11 to a respective common pivot shaft 36 mounted transversely below the power deck. The pivot shaft 36 has a pair of pivot arms 37 which are coupled to the left and right connecting rods 35 and additional pivot arms 38 and 39 that are coupled by respective yieldable spring couplings 40 to the output or actuator levers 25 of the left and right hydrostatic transmission 24. The spring couplings 40 each comprise a connecting rod 41 connected to the pivot arm 38 or 39, but which is connected by a respective spring 42 to a mounting plate 43 at the end of the respective lever 25. Details of this arrangement are better shown in FIGS. 4 and 5.

There are also respective left and right secondary pivot shafts 44 each associated with a respective one of the transmission actuator levers 25 and a respective one of the secondary or squeeze levers 33. Each lever 33 has a respective rigid connecting rod 45 that is connected to one arm of a bell crank 46 on the associated pivot shaft 44. The other arm of the bell crank 46 has a rigid connecting rod that is fastened to a connector rod 47 which is fastened to a coupler 48 on the respective actuator lever 25.

As shown in FIG. 5, associated with the common pivot shaft 36 is a return spring assembly 49 that is operative to return the actuator levers 25 to a neutral position when the operator releases the speed control levers 32 and 33. In this model, the return spring assembly 49 is mounted beneath the left side of the power deck 11 and is arranged to turn the common shaft 36 so as to urge the two actuator levers 25 to a neutral position when the operator releases both of the primary control levers 32. In the spring assembly 49, a rod 50 is connected to a pivot arm 51 on the pivot rod 36, and this rod 50 extends through a coil spring 52 that is supported between two aperture plates 53. The spring 52 biases the rod 50 towards a neutral position and thus also urges the shaft 36 and actuator levers 25 to the neutral position.

Other features of this mower include a fuel tank 54 that is mounted in advance of the engine 19.

A number of other standard features have been omitted from the drawing, but would be present on the mower. These would include an ignition switch, a throttle lever for the engine 19, an automatic engine kill switch, and such other safety equipment as may be required by law or local regulation. Also, while the transmissions 24 and drive wheels 17 here are positioned directly opposite one another, in other embodiments, their positions can be staggered.

With this mower, it is not necessary to disengage any belts to effect a directional change. The operator can control the power applied to each of the drive wheels 17 somewhat independently, by the right and left secondary control levers 33. Furthermore, because the operator can run one of the drive wheels forward and the other drive wheel in the reverse direction at the same time, the mower can be turned in a space not much larger than its own width. Also, because each of the drive wheels can have its space regulated either together or separately and can also be halted together or separately, the operator can control the speed and direction of the mower almost effortlessly, even when mowing across an incline where other mowers have a tendency to turn downhill.

Because the control levers seek neutral when released, the mower will come to halt if it gets away from the operator. No elaborate operator presence switch or engine kill switch is required.

With its steering precision, and its much wider mowing deck than is employed in other mowers, this mower reduces mowing time for a given lawn, and operator fatigue is also reduced.

Because there are no belts associated with the rear drive wheels, or disposed beneath the mowing deck, moisture will not affect the drive linkages or slow down operation. The heavy-duty hydrostatic transmissions 24 require little maintenance, and exhibit long life. When servicing is required, only simple hand tools and basic mechanical skills are needed, and routine maintenance requires much less time than is needed for belt driven mowers. If the mowing deck must be removed for some reason, the belt drive that connects the blade assembly with the engine can be easily detached and reinstalled without difficulty.

While this invention has been described in detail with respect to a single preferred embodiment, the invention certainly is not confined to that embodiment, and this invention is intended to cover many modifications and variations without departing from the scope and spirit thereof, as defined in the appended claims.

What is claimed is:

1. A self-propelled mower that comprises
    a front mowing deck housing a blade assembly containing one or more movable blades,
    a rear power deck containing an engine, left and right drive wheels, and a power train coupling the engine to the drive wheels,
    power take off means for connecting the blade assembly to the engine,
    handle bar means attached to the back of the power deck for steering the drive wheels, said handle bar means having left and right grip portions,
    said power train further including left and right hydrostatic transmission means, each having input shaft means connected to the engine, an output drive shaft connected to drive a respective one of the left and right drive wheels, and a speed regulator movable to set the speed ratio of the output drive shaft to the associated input shaft means within a continuous range from reverse, through neutral, wherein the associated output drive shaft is idle, to maximum forward;
    left and right primary speed control means positioned on the handle bar means adjacent said left and right grip portions and operatively connected to the respective left and right transmission speed regulators;
    left and right primary speed control linkages for yieldably urging the speed regulators of the respective hydrostatic transmission means to any desired position within said continuous range;
    a common movable member coupling both said primary speed control lever means to both said left and right primary speed control linkages so that the operator can select a desired drive wheel speed for the drive wheels with either hand without releasing the handle bar means or uncoupling the transmission means from the engine;
    left and right secondary speed control lever means mounted respectively on said handle bar means adjacent said left and right grip portions and which can be actuated without releasing the respective grip portion on the respective primary speed control lever means; and
    independent left and right secondary speed control linkages coupled respectively to said left and right secondary speed control lever means and also non-yieldably connected to the speed control regulators of the respective hydrostatic transmission means, such that actuating one of said left and right secondary speed control lever means urges the respective secondary linkage to move the respective transmission means speed regulator to a desired position, overriding the corresponding left or right primary speed control linkage but not affecting the speed regulator of the other transmission means as determined by said primary speed control lever means.

2. The mower of claim 1 wherein said left and right primary speed control lever means include respective left and right control levers mounted adjacent said left and right grip portions for rocking motion about a transverse axis, and which are thumb rockable forward to select a forward speed ratio or back to select a reverse speed ratio.

3. The mower of claim 2 wherein said common movable member includes a pivot shaft that is transversely mounted below the mower deck, with first and second pivot arms that extend from said pivot shaft on the left side of the mower and with third and fourth pivot arms that extend from said pivot shaft on the right side of the mower, the first and third pivot arms being coupled by a substantially rigid connecting rods to the left and right speed control lever means, respectively, and the second and fourth pivot arms being connected by yieldably rigid connecting members respectively to the speed regulators of the left and right hydrostatic transmission means, so that the motion of the speed control levers rotates the pivot shaft and moves the connecting member to urge the associated speed regulators to a desired speed setting.

4. The mower of claim 3 wherein each said yieldably rigid connecting member includes a connecting rod connected to the respective one of said second and fourth pivot arms and a spring connecting said connecting rod to the respective one of said speed regulators.

5. The mower of claim 1 wherein said secondary speed control linkages include respective left and right secondary pivot shafts, each having a first pivot arm coupled by a rigid connecting rod to the associated one of the left and right secondary speed control lever means, and a second pivot arm coupled by a rigid connecting rod to the associated transmission means speed regulator.

6. The mower of claim 1, further comprising resilient spring biasing means coupled to said common movable member for resiliently urging the same to a position corresponding to the neutral position of the speed regulators of said left and right transmission means, so that the hydrostatic transmission means revert to their neutral position when the operator releases both said primary speed control lever means.

* * * * *